(12) United States Patent
Connelly

(10) Patent No.: US 10,384,502 B2
(45) Date of Patent: Aug. 20, 2019

(54) SYSTEMS, DEVICES, AND/OR METHODS FOR MANAGING TOWING

(71) Applicant: Shawn Connelly, Commerce City, CO (US)

(72) Inventor: Shawn Connelly, Commerce City, CO (US)

( * ) Notice: Subject to any disclaimer, the term of this patent is extended or adjusted under 35 U.S.C. 154(b) by 72 days.

(21) Appl. No.: 15/644,806

(22) Filed: Jul. 9, 2017

(65) Prior Publication Data

US 2018/0022175 A1 Jan. 25, 2018

Related U.S. Application Data

(60) Provisional application No. 62/365,240, filed on Jul. 21, 2016.

(51) Int. Cl.
*B60D 1/46* (2006.01)
*B60D 1/02* (2006.01)
*B60P 3/12* (2006.01)

(52) U.S. Cl.
CPC ............. *B60D 1/46* (2013.01); *B60D 1/025* (2013.01); *B60P 3/127* (2013.01)

(58) Field of Classification Search
CPC ... B60D 1/46; B60D 1/025; B60P 3/07; B60P 3/127
USPC ....................................................... 280/490.1
See application file for complete search history.

(56) References Cited

U.S. PATENT DOCUMENTS

| | | | | | |
|---|---|---|---|---|---|
| 2,988,382 | A | * | 6/1961 | Holland | B60P 3/07 280/292 |
| 4,592,564 | A | * | 6/1986 | Warnock | B60R 9/10 280/292 |
| 5,620,197 | A | * | 4/1997 | Howes | B60R 9/06 280/402 |
| 5,674,044 | A | * | 10/1997 | Ranes | B60P 3/125 280/402 |
| 5,697,629 | A | * | 12/1997 | Guild | B60R 9/06 280/402 |
| 5,984,339 | A | * | 11/1999 | Guild | B60R 9/10 280/402 |
| 5,984,613 | A | * | 11/1999 | Motilewa | B60R 9/06 224/519 |
| 6,099,012 | A | * | 8/2000 | Mortimer | B60D 1/075 280/292 |
| 6,352,401 | B1 | * | 3/2002 | LeMay | B60P 3/125 280/402 |
| 6,447,237 | B1 | * | 9/2002 | Haynes | B60P 3/122 280/43.18 |
| 7,188,856 | B2 | * | 3/2007 | Maynard | B60P 3/077 280/402 |
| 8,246,067 | B1 | * | 8/2012 | Flathers | B60D 1/075 280/407 |
| 9,371,028 | B2 | * | 6/2016 | Misono | B60P 3/125 |
| 9,539,951 | B1 | * | 1/2017 | Levi | B60P 3/125 |

(Continued)

*Primary Examiner* — Jacob D Knutson
(74) *Attorney, Agent, or Firm* — Dale Jensen; Dale Jensen, PLC

(57) ABSTRACT

Certain exemplary embodiments can provide a tow bar. The tow bar is constructed to be coupled to a towing vehicle and a slingshot motorcycle. The tow bar defines a rectangular aperture. A length of the rectangular aperture is smaller than a diameter of a central tire of the slingshot motorcycle. The tow bar can be fixedly coupled to a pair of chains. Each of the pair of chains is coupleable to a bumper of the towing vehicle.

12 Claims, 7 Drawing Sheets

(56) References Cited

U.S. PATENT DOCUMENTS

2006/0104738 A1* 5/2006 Nolasco .................... B60P 3/07
    410/2
2015/0274087 A1* 10/2015 Yorke Roe ................ B60R 9/10
    414/462

* cited by examiner

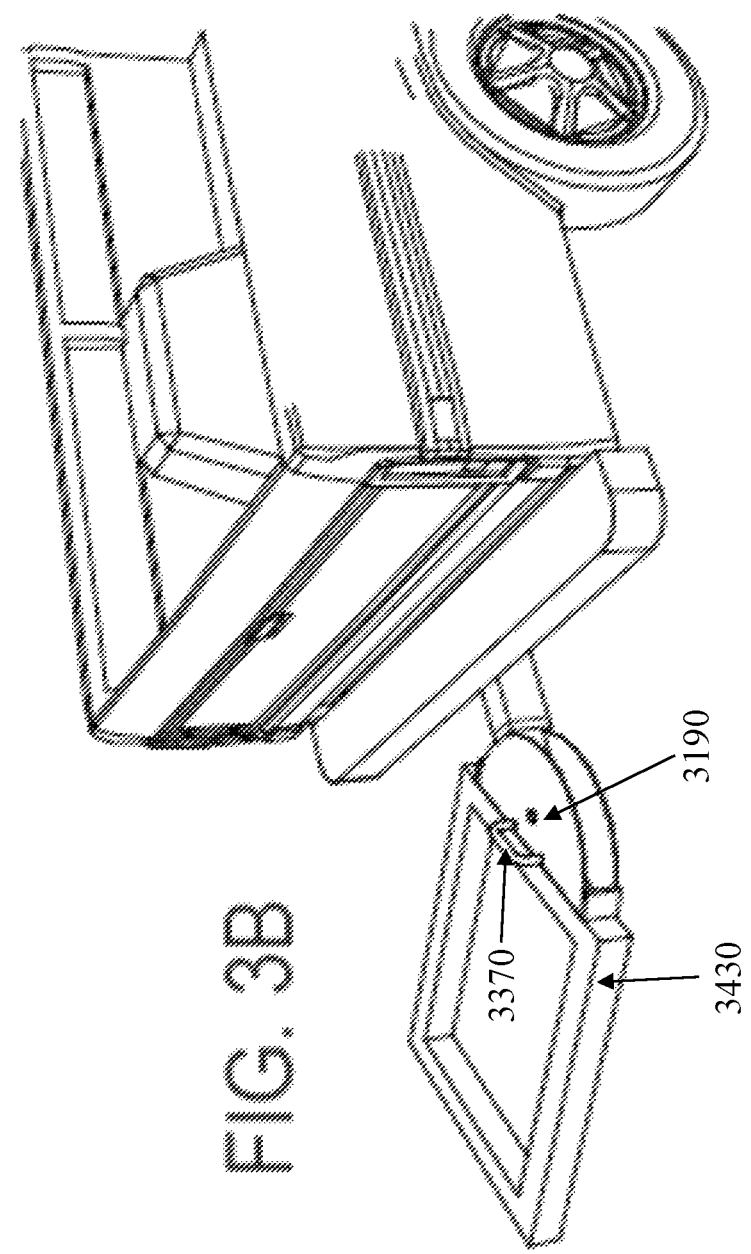

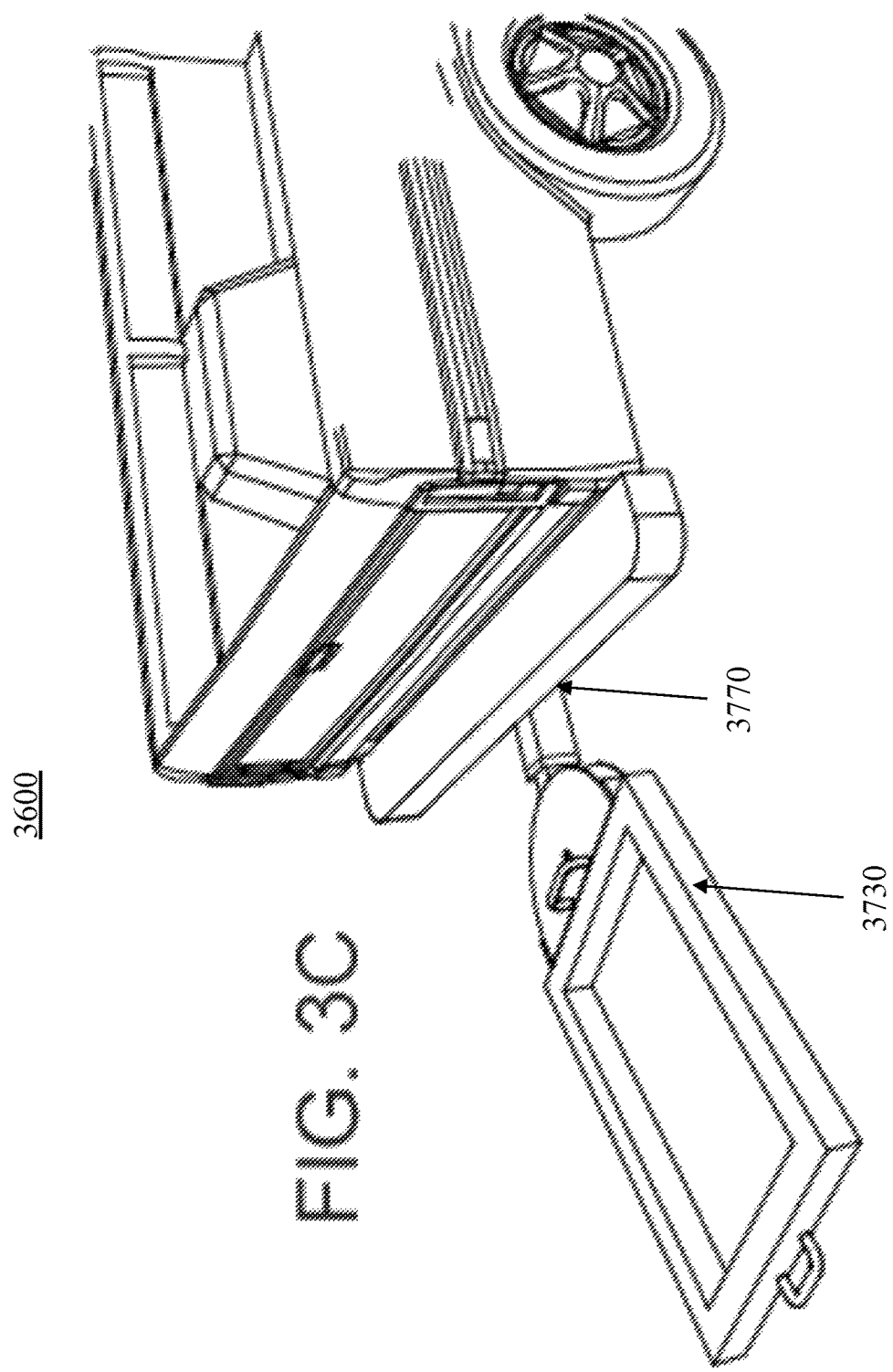

SYSTEMS, DEVICES, AND/OR METHODS FOR MANAGING TOWING

CROSS-REFERENCES TO RELATED APPLICATIONS

This application claims priority to, and incorporates by reference herein in its entirety, U.S. Provisional Patent Application Ser. No. 62/365,240, filed Jul. 21, 2016.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 3B is a perspective view of an exemplary embodiment of a system 3300;

FIG. 3C is a perspective view of an exemplary embodiment of a system 3600;

DETAILED DESCRIPTION

Certain exemplary embodiments can provide a tow bar. The tow bar is constructed to be coupled to a towing vehicle and a Slingshot® motorcycle. The tow bar defines a rectangular aperture. A length of the rectangular aperture is smaller than a diameter of a central tire of the Slingshot® motorcycle. The tow bar can be fixedly coupled to a pair of chains. Each of the pair of chains is coupleable to a bumper of the towing vehicle.

Figure 1:
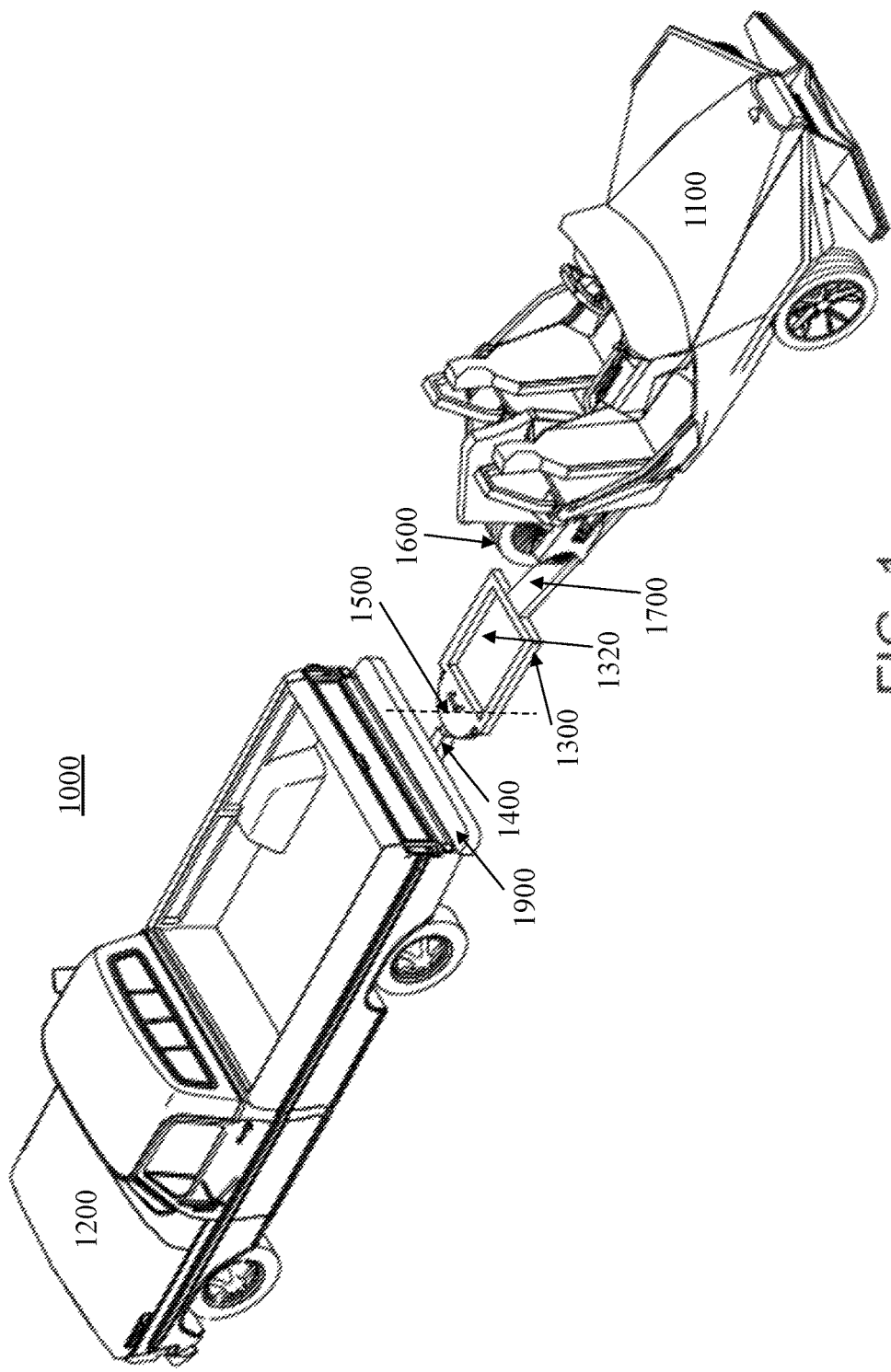
FIG. 1 is a perspective view of an exemplary embodiment of a system 1000.

FIG. 1 is a perspective view of an exemplary embodiment of a system 1000, which comprises a tow bar 1300 and a Slingshot® motorcycle 1100. Tow bar 1300 is constructed to couple a towing vehicle 1200 to Slingshot® motorcycle 1100 and, thereby, to allow the towing vehicle 1200 to tow Slingshot® motorcycle 1100. A tow bar 1300 comprises a hitch member 1400 that couples to towing vehicle 1200. Hitch member 1400 pivots about an axis 1500, which allows for improved maneuverability of coupled towing vehicle 1200 and Slingshot® motorcycle 1100.

Tow bar 1300 is constructed to be coupled to towing vehicle 1200 and Slingshot® motorcycle 1100. Tow bar defines a rectangular aperture 1320, a length (see length 3700 of FIG. 3A) of rectangular aperture 1320 is smaller than a diameter (see diameter 4800 of FIG. 4) of a central tire 1600 of Slingshot® motorcycle 1100. Tow bar 1300 can be fixedly coupled to a pair of chains (see pair of chains 2550 of FIG. 2). Each of the pair of chains (see pair of chains 2550 of FIG. 2) is coupleable to a bumper 1900 of towing vehicle 1200.

Hitch member 1400 is releasably coupleable to tow bar 1300. Hitch member 1400 is constructed to be releasably coupled to either (a) a towing hitch port (see towing hitch port 3770 of FIG. 3C) of towing vehicle 1200, or (b) a hitch coupler offset adapter (see hitch coupler offset adapter 2650 of FIG. 2). A ramp 1700 is releasably coupleable to tow bar 1300. Ramp 1700 constructed to facilitate coupling of Slingshot® motorcycle 1100 to tow bar 1300 via rolling central tire 1600 of Slingshot® motorcycle 1100 up or down ramp 1700.

A retaining hook (see retaining hook 2850 of FIG. 2) coupled to hitch member 1400. The retaining hook (see retaining hook 2850 of FIG. 2) is coupleable to towing vehicle 1200 to restrain hitch member 1400 from uncoupling from the towing hitch port (see towing hitch port 3770 of FIG. 3C) of towing vehicle 1200.

Figure 2:
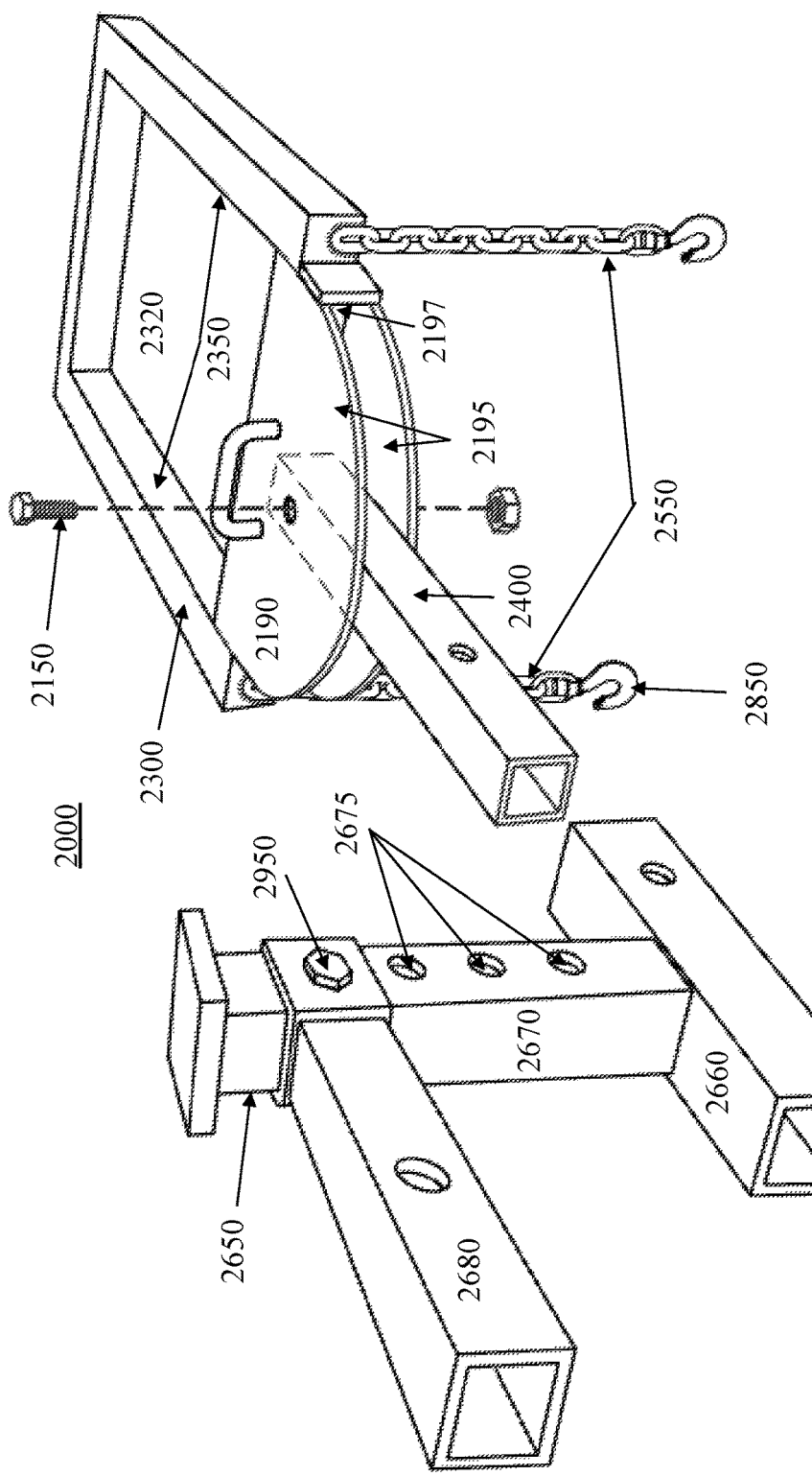
FIG. 2 is a perspective view of an exemplary embodiment of a system 2000.

The hitch coupler offset adapter (see hitch coupler offset adapter 2650 of FIG. 2) can be coupled to hitch member 1400 via a threaded fastener (see threaded fastener 2150 of FIG. 2). The hitch coupler offset adapter (see hitch coupler offset adapter 2650 of FIG. 2) comprises:

a hitch member sleeve (see hitch member sleeve 2660 of FIG. 2) that is constructed to engage with and be releasably coupled to hitch member 1400;

an adjustable offset post (see adjustable offset post 2670 of FIG. 2), which defines a plurality of apertures (see plurality of apertures 2675 of FIG. 2), each of the plurality of apertures (see plurality of apertures 2675 of FIG. 2) is constructed to allow tow bar 1300 to ride at a different elevation relative to the towing hitch port (see towing hitch port 3770 of FIG. 3C) of towing vehicle 1200, wherein the adjustable offset post (see adjustable offset post 2670 of FIG. 2) can be fixedly coupled to hitch member sleeve (see hitch member sleeve 2660 of FIG. 2); and a hitch coupler member (see hitch coupler member 2680 of FIG. 2) that is constructed to be releasable coupled to the towing hitch port (see towing hitch port 3770 of FIG. 3C) of towing vehicle 1200, wherein the hitch coupler member (see hitch coupler member 2680 of FIG. 2) is releasably coupled to the adjustable offset post (see adjustable offset post 2670 of FIG. 2) via a threaded fastener (see threaded fastener 2150 of FIG. 2).

System 1000 can comprise a ramp flange (see ramp flange 3450 of FIG. 3A) that is constructed to releasably couple ramp 1700 to tow bar 1300.

System 1000 can comprise a tow bar head (see tow bar head 2190 of FIG. 2). The tow bar head (see tow bar head 2190 of FIG. 2) defines part of the rectangular aperture 1320. The tow bar head (see tow bar head 2190 of FIG. 2) comprises a pair of substantially planar plates (see pair of substantially planar plates 2195 of FIG. 2), wherein each of the substantially planar plates (see pair of substantially planar plates 2195 of FIG. 2) is coupled to a back plate (see back plate 2197 of FIG. 2), wherein:

the back plate (see back plate 2197 of FIG. 2) is coupled to two sides of tow bar 1300, the back plate and two sides (see two sides 2350 of FIG. 2) of the tow bar defining three sides of rectangular aperture 1320; and hitch member 1400 is coupleable to tow bar 1300 via sliding hitch member 1400 between the pair of substantially planar plates (see pair of substantially planar plates 2195 of FIG. 2). A handle (see handle 3370 of FIG. 3B) is fixedly coupled to the tow bar head (see tow bar head 2190 of FIG. 2), the handle (see handle 3370 of FIG. 3B) is constructed to allow a user to lift tow bar 1300.

Tow bar 1300 is coupleable to hitch member 1400 via a threaded fastener (see threaded fastener 2150 of FIG. 2).

FIG. 2 is a perspective view of an exemplary embodiment of a system 2000, which comprises a tow bar 2300 and a hitch coupler offset adapter 2650. Tow bar 2300 comprises one or more of:

- a pair of chains 2550 each of which coupleable to a bumper of a towing vehicle;
- a tow bar head 2190, which comprises a pair of substantially planar plates 2195 and a back plate 2197 coupled thereto;
- a threaded fastener 2150, which can be one of a plurality of threaded fasteners used to releasably couple any of the components of system 2000 that are coupleable via defined apertures;
- retaining hook 2850, which is coupleable to a towing vehicle to restrain a hitch member 2400 from uncoupling from a towing hitch port of the towing vehicle; and/or
- two sides 2350, wherein the back plate and two sides 2350 of tow bar 2300 define three sides of rectangular aperture 2320.

Hitch coupler offset adapter 2650 comprises one or more of:

- hitch member sleeve 2660 that is constructed to engage with and be releasably coupled to hitch member 2400;
- an adjustable offset post 2670, which defines a plurality of apertures 2675, each of plurality of apertures 2675 is constructed to allow tow bar 2300 to ride at a different elevation relative to a towing hitch port (see towing hitch port 3770 of FIG. 3) of the towing vehicle, wherein adjustable offset post 2670 can be fixedly coupled to hitch member sleeve 2660; and/or
- a hitch coupler member 2680 that is constructed to be releasable coupled to a towing hitch port (see towing hitch port 3770 of FIG. 3C) of the towing vehicle, wherein hitch coupler member 2680 is releasably coupled to adjustable offset post 2670 via a threaded fastener 2950.

Figure 3A:
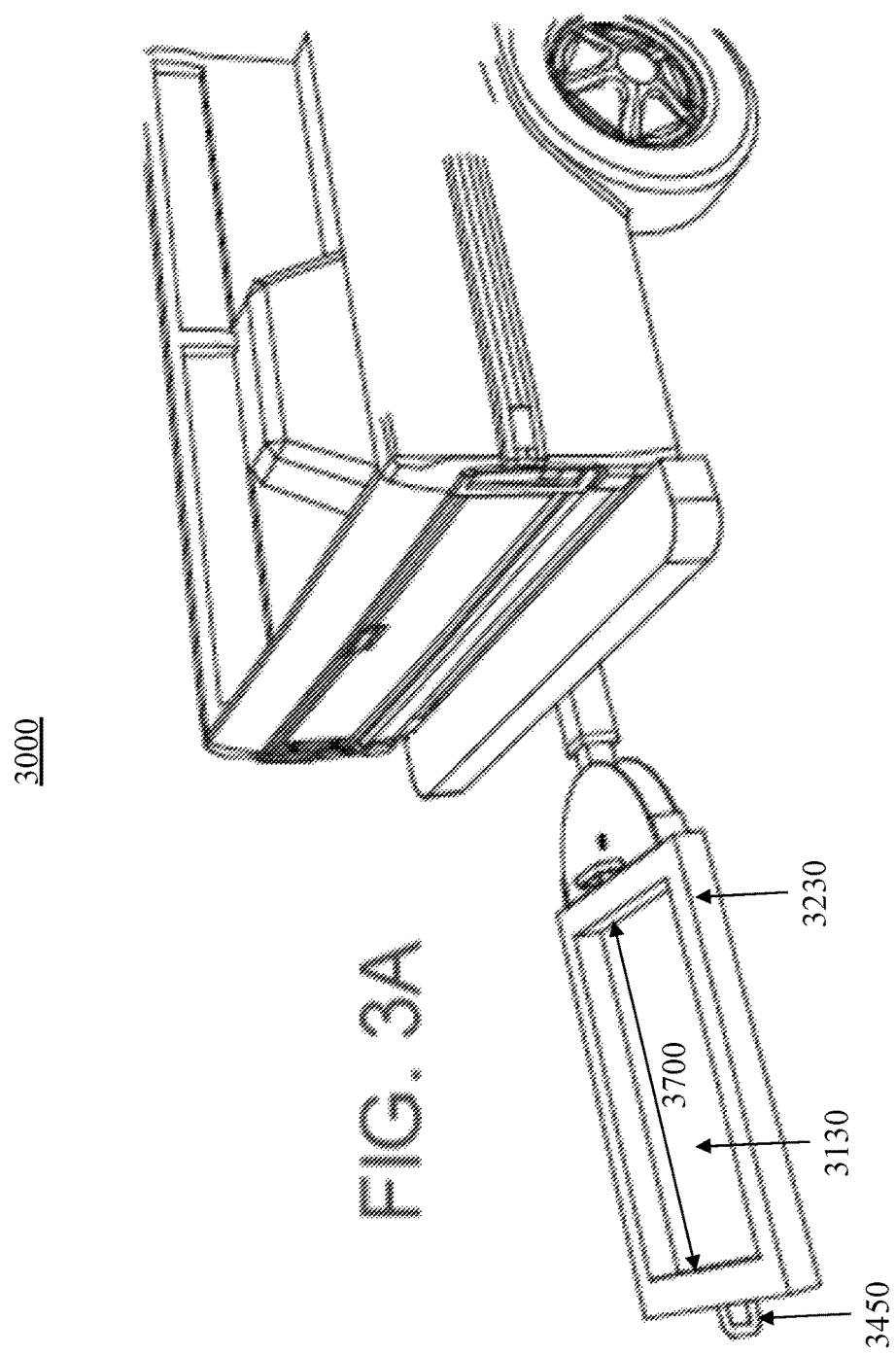
FIG. 3A is a perspective view of an exemplary embodiment of a system 3000.

FIG. 3A is a perspective view of an exemplary embodiment of a system 3000, which shows a tow bar 3230. Tow bar 3230 comprises a ramp flange 3450 that is constructed to releasably couple ramp (see ramp 1700 of FIG. 1) to tow bar 3230. A rectangular aperture 3130 has a length 3700 that is selected in order to retain a central tire (see central tire 1600 of FIG. 1) of a Slingshot® motorcycle (see Slingshot® motorcycle 1100 of FIG. 1).

FIG. 3B is a perspective view of an exemplary embodiment of a system 3300. A handle 3370 is fixedly coupled to a tow bar head 3190. The handle 3370 is constructed to allow a user to lift a tow bar 3430.

FIG. 3C is a perspective view of an exemplary embodiment of a system 3600, which comprises a towing hitch port 3770 to which a tow bar 3730 can be coupled.

Figure 4:
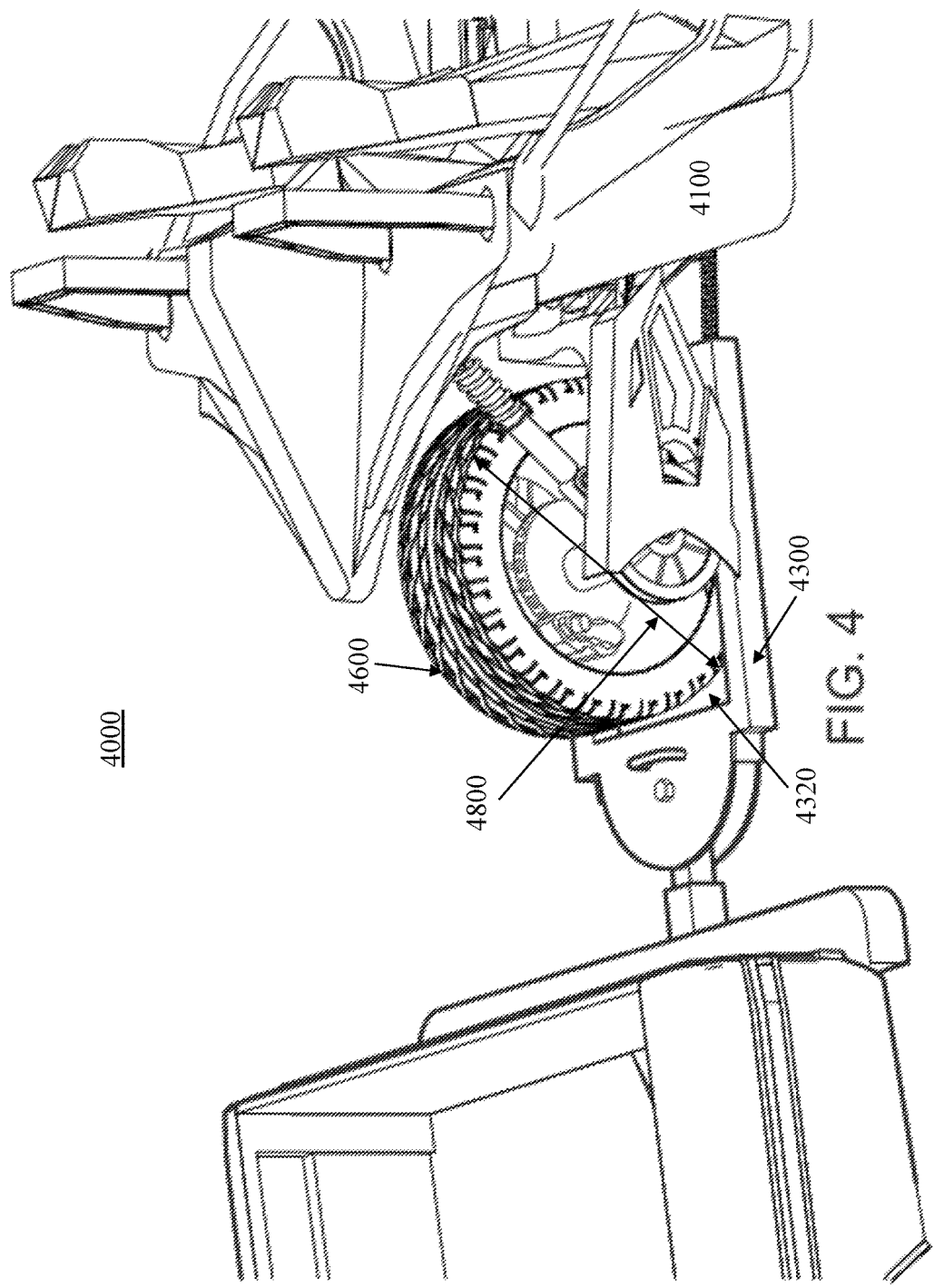
FIG. 4 is a perspective view of an exemplary embodiment of a system 4000.

FIG. 4 is a perspective view of an exemplary embodiment of a system 4000, which illustrates a tow bar 4300 with a central tire 4600 of a Slingshot® motorcycle 4100 placed thereon. Tow bar 4300 defines a rectangular aperture 4320, a length (see length 3700 of FIG. 3A) of rectangular aperture 4320 is smaller than a diameter (see diameter 4800 of FIG. 4) of central tire 4600 of Slingshot® motorcycle 4100.

Figure 5:
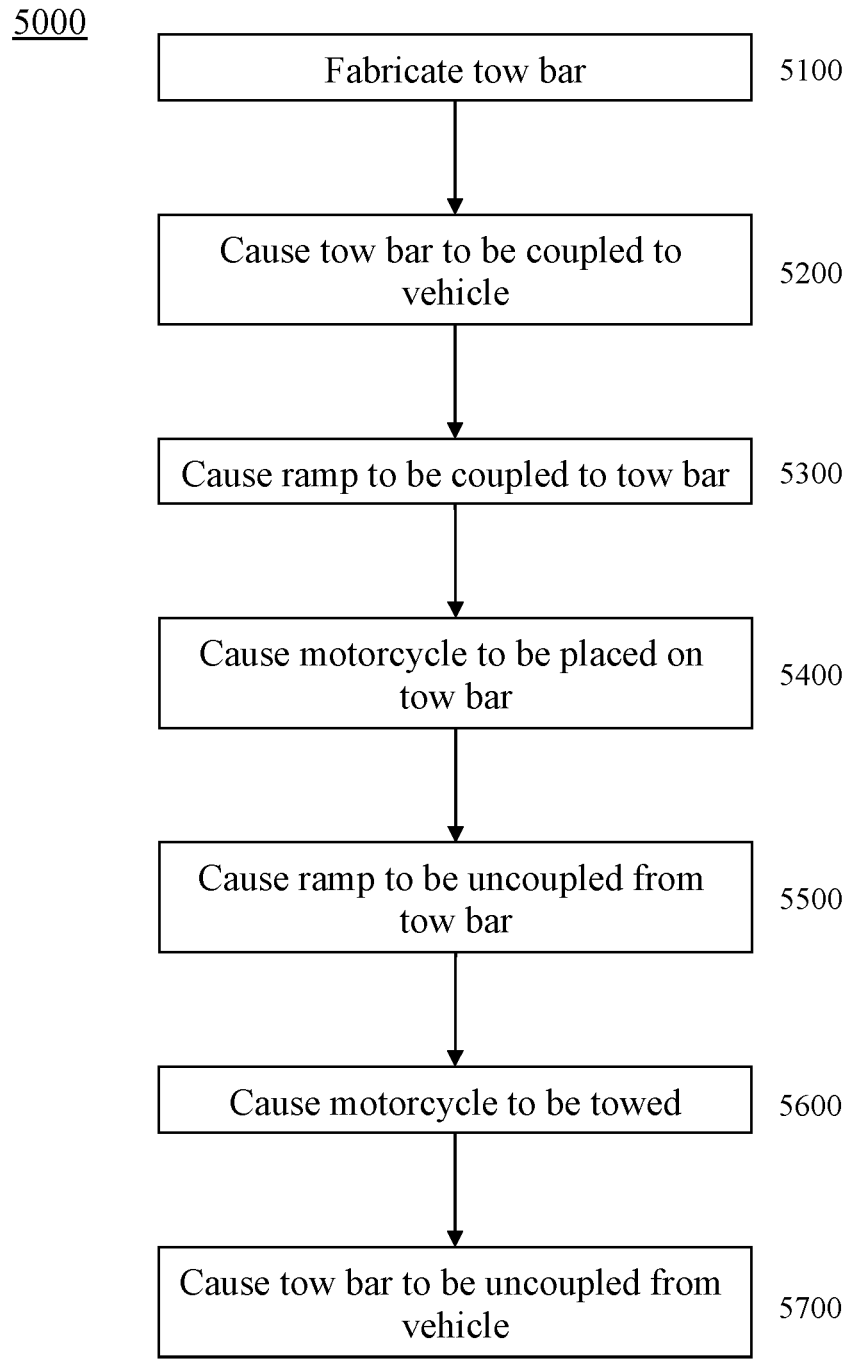
FIG. 5 is a flowchart of an exemplary embodiment of a method 5000.

FIG. 5 is a flowchart of an exemplary embodiment of a method 5000. At activity 5100, a tow bar can be fabricated. At activity 5200, certain exemplary embodiments comprise causing a system comprising the tow bar to be coupled to a towing vehicle. The system can comprise:

- a tow bar that is constructed to be coupled to the towing vehicle and a Slingshot® motorcycle, the tow bar defines a rectangular aperture, a length of the rectangular aperture is smaller than a diameter of a central tire of the Slingshot® motorcycle, the tow bar can be fixedly coupled to a pair of chains, each of the pair of chains can be coupleable to a bumper of the towing vehicle;
- a hitch member is releasably coupleable to the tow bar, the hitch member is constructed to be releasably coupled to either (a) a towing hitch port of the towing vehicle, or (b) a hitch coupler offset adapter; and/or
- a ramp, the ramp releasably coupleable to the tow bar, the ramp constructed to facilitate coupling of the Slingshot® motorcycle to the tow bar via rolling a central wheel of the Slingshot® motorcycle up or down the ramp.

At activity 5300, certain exemplary embodiments comprise causing the ramp to be releasably coupled to the tow bar. At activity 5400, certain exemplary embodiments comprise causing the motorcycle to be placed on the tow bar. At activity 5500, certain exemplary embodiments comprise causing the ramp to be nondestructibly uncoupled from the tow bar. At activity 5600, certain exemplary embodiments comprise causing the motorcycle to be towed. At activity 5700, certain exemplary embodiments comprise causing the tow bar to be uncoupled from the vehicle.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof
adapter—a device used to effect operative compatibility between different parts of one or more pieces of an apparatus or system.
adjustable offset post—a component that couples a hitch member sleeve to a hitch coupler member.
and/or—either in conjunction with or in alternative to.
aperture—an opening or hole.
apparatus—an appliance or device for a particular purpose
associate—to join, connect together, and/or relate.
back plate—a substantially planar portion of a tow bar head that defines part of an aperture of the tow bar.
bumper—a metal guard on the rear of a vehicle.
can—is capable of, in at least some embodiments.
cause—to produce an effect.
central tire—a tire on one end of a Slingshot® motorcycle, wherein the opposing end of the Slingshot® motorcycle from the end that comprises the central tire comprises a pair of tires.
chain—a series of metal rings passing through one another, used either for various purposes requiring a somewhat flexible connection with relatively high tensile strength, as for towing and/or supporting.
comprising—including but not limited to.
configure—to make suitable or fit for a specific use or situation.

connect—to join or fasten together.
constructed to—made to and/or designed to.
convert—to transform, adapt, and/or change.
couple—to join, connect, and/or link together.
coupling—linking in some fashion.
define—to establish the outline, form, or structure of
determine—to obtain, calculate, decide, deduce, and/or ascertain.
device—a machine, manufacture, and/or collection thereof.
diameter—a length of a line passing through the center of a substantially circular object and meeting the circumference or surface at each end.
different elevation—a changed altitude above ground level.
engage—to be in contact and interact with.
facilitate—to make an action easier.
fastener—one (or more) restraints that attach to, extend through, penetrate, and/or hold something. For example, a fastener can be one (or more) bolt and nut assembly, rivet, weldment, nail, screw, peg, staple, clip, buckle, clasp, clamp, hook and loop assembly, adhesive, and/or plastic push rivet, etc.
fixedly—coupled so as to be firm and substantially not nondestructibly removable.
flange—a projecting component to which something can be coupled.
generate—to create, produce, give rise to, and/or bring into existence.
hitch coupler member—a component of a hitch coupler offset adapter that couples directly to the towing hitch port of a vehicle.
hitch coupler offset adapter—a system that when coupled to a towing port hitch of a vehicle and a tow bar, causes the tow bar to ride at a different elevation than a towing port hitch of a vehicle.
hitch member—a part that engages with a towing hitch of the vehicle.
hitch member sleeve—a component that engages with a hitch member.
install—to connect or set in position and prepare for use.
length—a longest extent of something as measured from end to end.
lift—to move or bring something upward from the ground or other support to a higher position.
may—is allowed and/or permitted to, in at least some embodiments.
method—a process, procedure, and/or collection of related activities for accomplishing something.
planar—substantially flat.
plate—a substantially planar piece of metal.
plurality—the state of being plural and/or more than one.
predetermined—established in advance.
provide—to furnish, supply, give, and/or make available.
ramp—an inclined plane that can be used as an aid for raising or lowering a load.
receive—to physically engage with something.
rectangular—having a shape of a parallelogram that comprises four substantially right angles.
releasably—coupled so as to be substantially nondestructibly removable.
repeatedly—again and again; repetitively.
request—to express a desire for and/or ask for.
restrain—to limit motion of something.
retaining hook—a device that is coupled to a chain or structure and can pass through a loop and grab the loop such that the chain or structure is coupled to the device and/or system comprising the loop.
roll—to move or be moved on wheels.
set—a related plurality.
slide—to move along a surface.
Slingshot® motorcycle—a three-wheeled motor vehicle.
smaller—lesser in size.
substantially—to a great extent or degree.
support—to bear the weight of, especially from below.
system—a collection of mechanisms, devices, machines, articles of manufacture, processes, data, and/or instructions, the collection designed to perform one or more specific functions.
threaded—defining helical ridges as with a screw.
tow—to pull or haul (a car, barge, trailer, etc.) by a rope, chain, or other device.
tow bar—a device coupleable to a chassis of a first vehicle that is also coupleable to a second vehicle that is relocated via the first vehicle.
tow bar head—a part of a tow bar that is directly coupled to the hitch member.
towing hitch port—a device attached to a chassis of a vehicle that is coupleable to a tow bar or tow ball.
vehicle—a conveyance moving on wheels, runners, tracks, or the like, as a cart, sled, automobile, truck, pickup truck, jeep, sport utility vehicle, or tractor, etc.
via—by way of and/or utilizing.
uncouple—to separate, disconnect, and/or unlink two or more things.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
   a tow bar, the tow bar constructed to be coupled to a towing vehicle and a three-wheeled motorcycle, the tow bar defining a rectangular aperture, a length of the rectangular aperture smaller than a diameter of a central tire of the three-wheeled motorcycle, the tow bar fixedly coupled to a pair of chains, each of the pair of chains coupleable to a bumper of the towing vehicle;
   a hitch member releasably coupleable to the tow bar, the hitch member constructed to be releasably coupled to either (a) a towing hitch port of the towing vehicle, or (b) a hitch coupler offset adapter; and
   a ramp, the ramp releasably coupleable to the tow bar, the ramp constructed to facilitate coupling of the three-wheeled motorcycle to the tow bar via rolling a central wheel of the three-wheeled motorcycle up or down the ramp;
   a tow bar head, the tow bar head defining part of the rectangular aperture, the tow bar head comprising a pair of substantially planar plates, wherein the hitch member is coupleable to the tow bar via sliding the hitch member between the pair of substantially planar plates, wherein a handle is fixedly coupled to the tow bar head, the handle constructed to allow a user to lift the tow bar.

2. The system of claim 1, further comprising:
   a retaining hook coupled to the hitch member, the retaining hook coupleable to the towing vehicle to restrain the hitch member from uncoupling from the towing hitch port of the towing vehicle.

3. The system of claim 1, further comprising:
   the hitch coupler offset adapter, the hitch coupler offset adapter comprising:
      a hitch member sleeve that is constructed to engage with and be releasably coupled to the hitch member;
      an adjustable offset post, the adjustable offset post defining a plurality of apertures, each of the plurality of apertures constructed to allow the tow bar to ride at a different elevation relative to the towing hitch port of the towing vehicle; and
      a hitch coupler member that is constructed to be releasable coupled to the towing hitch port of the towing vehicle.

4. The system of claim 1, further comprising:
   the hitch coupler offset adapter, the hitch coupler offset adapter comprising:
      a hitch member sleeve that is constructed to engage with and be releasably coupled to the hitch member;
      an adjustable offset post, the adjustable offset post defining a plurality of apertures, each of the plurality of apertures constructed to allow the tow bar to ride at a different elevation relative to the towing hitch port of the towing vehicle, wherein the adjustable offset post is fixedly coupled to the hitch member sleeve; and
      a hitch coupler member that is constructed to be releasable coupled to the towing hitch port of the towing vehicle.

5. The system of claim 1, further comprising:
   the hitch coupler offset adapter, wherein the hitch coupler offset adapter is coupled to the hitch member via a threaded fastener, the hitch coupler offset adapter comprising:
      a hitch member sleeve that is constructed to engage with and be releasably coupled to the hitch member;
      an adjustable offset post, the adjustable offset post defining a plurality of apertures, each of the plurality of apertures constructed to allow the tow bar to ride at a different elevation relative to the towing hitch port of the towing vehicle, wherein the adjustable offset post is fixedly coupled to the hitch member sleeve; and
      a hitch coupler member that is constructed to be releasable coupled to the towing hitch port of the towing vehicle.

6. The system of claim 1, further comprising:
   the hitch coupler offset adapter, the hitch coupler offset adapter comprising:
      a hitch member sleeve that is constructed to engage with and be releasably coupled to the hitch member;
      an adjustable offset post, the adjustable offset post defining a plurality of apertures, each of the plurality of apertures constructed to allow the tow bar to ride at a different elevation relative to the towing hitch port of the towing vehicle; and
      a hitch coupler member that is constructed to be releasable coupled to the towing hitch port of the towing vehicle, wherein the hitch coupler member is releasably coupled to the adjustable offset post via a threaded fastener.

7. The system of claim 1, further comprising:
   a ramp flange that is constructed to releasably couple the ramp to the tow bar.

8. The system of claim 1, further comprising:
   the tow bar head, the tow bar head defining part of the rectangular aperture, the tow bar head comprising the pair of substantially planar plates, wherein each of the substantially planar plates is coupled to a back plate, wherein:
      the back plate is coupled to two sides of the tow bar, the back plate and two sides of the tow bar defining three sides of the rectangular aperture; and
      the hitch member is coupleable to the tow bar via sliding the hitch member between the pair of substantially planar plates.

9. The system of claim 1, wherein:
the tow bar is coupleable to the hitch member via a threaded fastener.

10. A method comprising a plurality of activities, comprising:
causing a system to be coupled to a towing vehicle, the system comprising:
a tow bar, the tow bar constructed to be coupled to the towing vehicle and a three-wheeled motorcycle, the tow bar defining a rectangular aperture, a length of the rectangular aperture smaller than a diameter of a central tire of the three-wheeled motorcycle, the tow bar fixedly coupled to a pair of chains, each of the pair of chains coupleable to a bumper of the towing vehicle;
a hitch member releasably coupleable to the tow bar, the hitch member constructed to be releasably coupled to either (a) a towing hitch port of the towing vehicle, or (b) a hitch coupler offset adapter; and
a ramp, the ramp releasably coupleable to the tow bar, the ramp constructed to facilitate coupling of the three-wheeled motorcycle to the tow bar via rolling a central wheel of the three-wheeled motorcycle up or down the ramp;
a tow bar head, the tow bar head defining part of the rectangular aperture, the tow bar head comprising a pair of substantially planar plates, wherein the hitch member is coupleable to the tow bar via sliding the hitch member between the pair of substantially planar plates, wherein a handle is fixedly coupled to the tow bar head, the handle constructed to allow a user to lift the tow bar.

11. The method of claim 10, further comprising:
causing the ramp to be releasably coupled to the tow bar.

12. A system comprising:
a tow bar, the tow bar constructed to be coupled to a towing vehicle and a three-wheeled motorcycle, the tow bar defining a rectangular aperture, a length of the rectangular aperture smaller than a diameter of a central tire of the three-wheeled motorcycle, the tow bar fixedly coupled to a pair of chains, each of the pair of chains coupleable to a bumper of the towing vehicle;
a hitch member releasably coupleable to the tow bar, the hitch member constructed to be releasably coupled to either (a) a towing hitch port of the towing vehicle, or (b) a hitch coupler offset adapter; and
a ramp, the ramp releasably coupleable to the tow bar, the ramp constructed to facilitate coupling of the three-wheeled motorcycle to the tow bar via rolling a central wheel of the three-wheeled motorcycle up or down the ramp;
a tow bar head, the tow bar head defining part of the rectangular aperture, the tow bar head comprising a pair of substantially planar plates, wherein each of the substantially planar plates is coupled to a back plate, wherein:
the back plate is coupled to two sides of the tow bar, the back plate and two sides of the tow bar defining three sides of the rectangular aperture; and
the hitch member is coupleable to the tow bar via sliding the hitch member between the pair of substantially planar plates.

* * * * *